(12) United States Patent
Lane et al.

(10) Patent No.: US 10,855,385 B2
(45) Date of Patent: Dec. 1, 2020

(54) SYSTEM AND METHOD FOR CONTROLLING BROADCAST MULTIMEDIA USING PLURAL WIRELESS NETWORK CONNECTIONS

(71) Applicant: QUALCOMM Incorporated, San Diego, CA (US)

(72) Inventors: Richard Doil Lane, San Diego, CA (US); William Robert Gardner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 14/796,949

(22) Filed: Jul. 10, 2015

(65) Prior Publication Data
US 2015/0326328 A1 Nov. 12, 2015

Related U.S. Application Data

(60) Division of application No. 13/034,591, filed on Feb. 24, 2011, now Pat. No. 9,083,475, which is a
(Continued)

(51) Int. Cl.
*H04H 40/00* (2009.01)
*H04H 20/57* (2008.01)
(Continued)

(52) U.S. Cl.
CPC ............ *H04H 20/57* (2013.01); *H04H 60/21* (2013.01); *H04H 60/23* (2013.01); *H04L 12/189* (2013.01);
(Continued)

(58) Field of Classification Search
CPC ......... H04W 72/0453; H04W 72/0406; H04W 72/042; H04W 4/06; H04W 4/18;
(Continued)

(56) References Cited

U.S. PATENT DOCUMENTS 5,247,575 A * 9/1993 Sprague ................. G06F 21/10
379/55.1
5,907,563 A 5/1999 Takeuchi et al.
(Continued)

FOREIGN PATENT DOCUMENTS

CN 1155225 A 7/1997
CN 1336768 A 2/2002
(Continued)

OTHER PUBLICATIONS

"Frontier of Mobile Phones, BREW, World Standard Mobile-Phone Application Platform which Expands Possibility of Usefor Business," Mobile Internet, RIC TELECOM., Jun. 10, 2002, vol. 2, No. 17, pp. 44-48.
(Continued)

*Primary Examiner* — Tu X Nguyen
(74) *Attorney, Agent, or Firm* — Arent Fox LLP

(57) ABSTRACT

Digital multimedia is broadcast to wireless receivers on a unidirectional wireless broadcast channel, while control data necessary for presentation of the multimedia is provided on a bidirectional, point-to-point wireless link.

33 Claims, 2 Drawing Sheets

Related U.S. Application Data continuation of application No. 10/748,603, filed on Dec. 29, 2003, now Pat. No. 7,925,203.

(60) Provisional application No. 60/442,007, filed on Jan. 22, 2003.

(51) Int. Cl.
| | | |
|---|---|---|
| *H04M 15/00* | (2006.01) | |
| *H04H 60/21* | (2008.01) | |
| *H04L 12/18* | (2006.01) | |
| *H04L 29/06* | (2006.01) | |
| *H04W 76/14* | (2018.01) | |
| *H04W 12/00* | (2009.01) | |
| *H04H 60/23* | (2008.01) | |
| *H04W 12/02* | (2009.01) | |
| *H04H 60/91* | (2008.01) | |
| *H04W 4/06* | (2009.01) | |

(52) U.S. Cl.
CPC ........ *H04L 63/0428* (2013.01); *H04M 15/61* (2013.01); *H04M 15/8214* (2013.01); *H04W 12/0017* (2019.01); *H04W 12/02* (2013.01); *H04W 76/14* (2018.02); *H04H 60/91* (2013.01); *H04W 4/06* (2013.01)

(58) Field of Classification Search
CPC ..... H04W 88/06; H04W 36/14; H04W 48/10; H04W 76/025; H04W 84/042
USPC .......................................... 455/3.06
See application file for complete search history.

(56) References Cited

U.S. PATENT DOCUMENTS

| | | |
|---|---|---|
| 6,172,673 B1 | 1/2001 | Lehtinen et al. |
| 6,240,282 B1 | 5/2001 | Kleider et al. |
| 6,429,812 B1 | 8/2002 | Hoffberg |
| 6,574,794 B1 | 6/2003 | Sarraf |
| 6,680,927 B2 | 1/2004 | Yano et al. |
| 7,072,865 B2 | 7/2006 | Akiyama |
| 7,269,260 B2 | 9/2007 | Adachi et al. |
| 7,283,817 B2 | 10/2007 | Salo et al. |
| 7,336,788 B1 * | 2/2008 | Hendricks .............. G06F 21/10 380/202 |
| 7,925,203 B2 | 4/2011 | Lane et al. |
| 2001/0023416 A1 | 9/2001 | Hosokawa |
| 2002/0059614 A1 | 5/2002 | Lipsanen et al. |
| 2003/0026424 A1 | 2/2003 | McGarrahan et al. |
| 2003/0078061 A1 | 4/2003 | Kim |
| 2003/0084283 A1 | 5/2003 | Pixton |
| 2003/0220091 A1 | 11/2003 | Farrand et al. |
| 2003/0236065 A1 * | 12/2003 | Leinonen ............. H04B 1/3805 455/3.05 |
| 2004/0097246 A1 * | 5/2004 | Welch ................... H04H 20/28 455/466 |
| 2005/0157693 A1 | 7/2005 | Lopez et al. |
| 2011/0143653 A1 | 6/2011 | Lane et al. |

FOREIGN PATENT DOCUMENTS

| | | |
|---|---|---|
| DE | 19905628 | 8/2000 |
| EP | 1081884 A2 | 3/2001 |
| GB | 2370456 | 6/2002 |
| JP | 1098706 A | 4/1989 |
| JP | 8008850 A | 1/1996 |
| JP | 9298526 A | 11/1997 |
| JP | 2000252929 A | 9/2000 |
| JP | 2001268535 A | 9/2001 |
| JP | 2002353918 A | 12/2002 |
| JP | 2004080578 A | 3/2004 |
| WO | 9628904 A1 | 9/1996 |
| WO | 99014775 | 3/1999 |
| WO | 0203698 A1 | 1/2002 |

OTHER PUBLICATIONS

International Search Report—PCT/US04/001882, International Search Authority—European Patent Office—dated Mar. 10, 2005.
Notification of First Office Action, the State Intellectual Property Office of the People's Republic of China, issued in Chinese Application No. 201210023638.8 dated Mar. 18, 2014, 23 pages.
Partial Translation of Appeal Decision of Rejection issued in Japanese Application No. 2011-137191 dated Mar. 31, 2015, 10 pages.
Supplementary European Search Report issued in European application No. EP 04704474 dated Sep. 24, 2009.
Written Opinion issued in PCT application No. PCT/US2004/001882, International Search Authority—US Patent Office—dated Mar. 10, 2005.

* cited by examiner

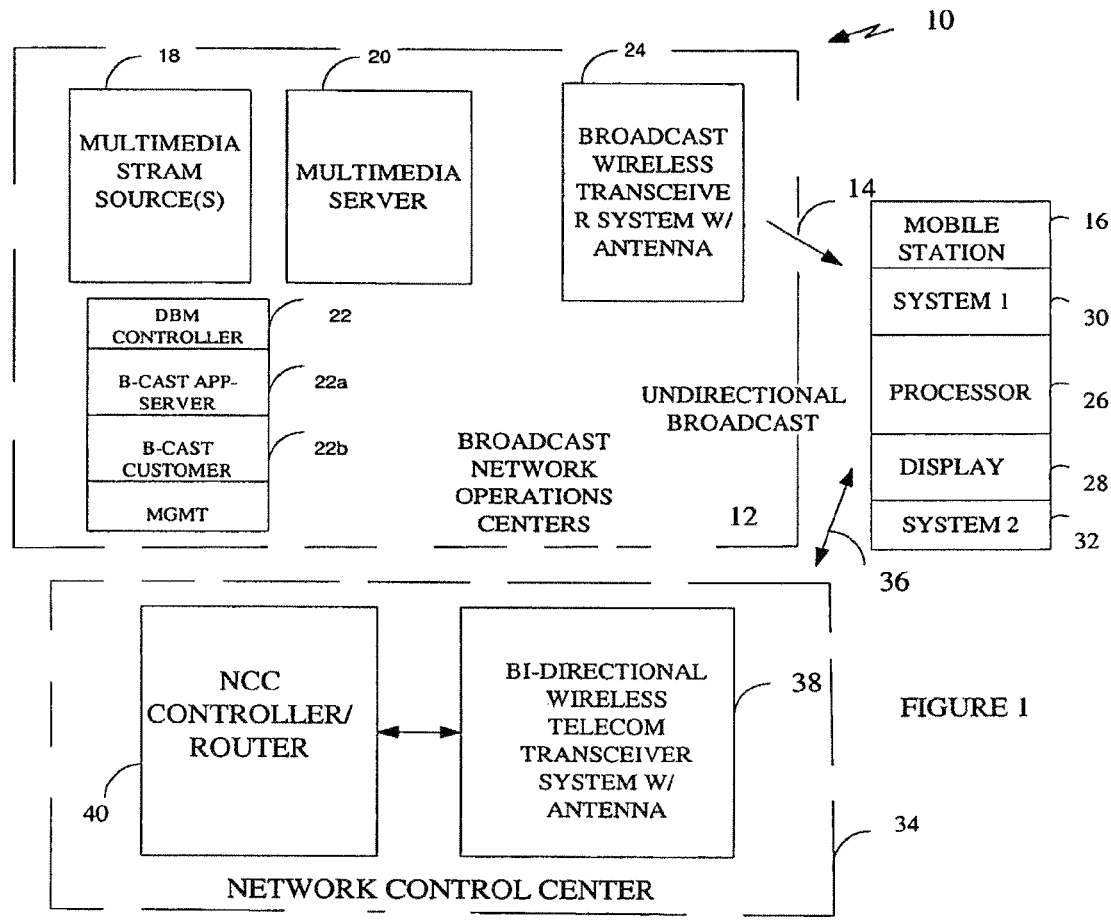
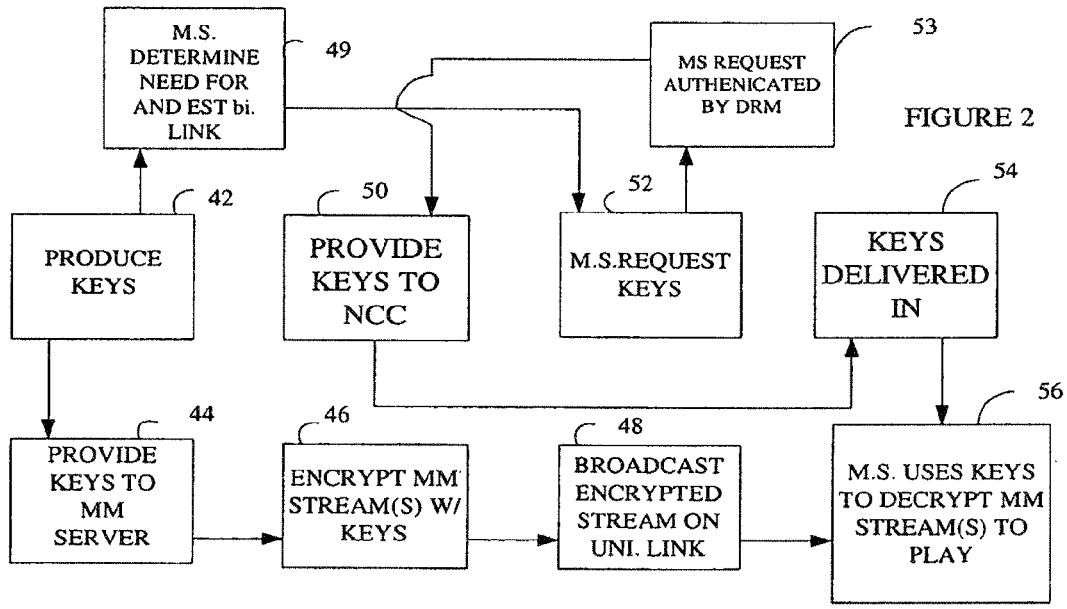

SYSTEM AND METHOD FOR CONTROLLING BROADCAST MULTIMEDIA USING PLURAL WIRELESS NETWORK CONNECTIONS

CROSS-REFERENCE TO RELATED APPLICATIONS

This application is a divisional of U.S. application Ser. No. 13/034,591, filed on Feb. 24, 2011, entitled SYSTEM AND METHOD FOR CONTROLLING BROADCAST MULTIMEDIA USING PLURAL WIRELESS NETWORK CONNECTIONS, which is a continuation of and claims the benefit of priority to U.S. patent application Ser. No. 10/748,603, filed on Dec. 29, 2003, entitled SYSTEM AND METHOD FOR CONTROLLING BROADCAST MULTIMEDIA USING PLURAL WIRELESS NETWORK CONNECTIONS, which is a non-provisional of and claims the benefit of priority to U.S. Provisional Patent Application Ser. No. 60/442,007, filed on Jan. 22, 2003, entitled SYSTEM AND METHOD FOR CONTROLLING BROADCAST MULTIMEDIA USING PLURAL WIRELESS NETWORK CONNECTIONS, each of said applications assigned to the assignee hereof, and all of said applications expressly incorporated by reference herein in their entireties.

FIELD OF THE INVENTION

The present invention relates generally to computer-based communication systems.

BACKGROUND OF THE INVENTION

Digital multimedia data such as video and music can be transmitted wirelessly to mobile receivers, such as wireless telephones, for playing of the multimedia by users of the mobile receivers. Such data typically may be broadcast.

In addition to the multimedia data itself, ancillary control data must also be provided to the receivers. This control data includes, e.g., decryption keys for decrypting the multimedia data, which may be encrypted to protect rights in the media. Also, the control data can include information related to a user's subscription to the broadcast, a user's registration for the broadcast service, billing information, and access control data.

Current methods for the wireless broadcast provision of digital media send the control data along with the multimedia data. As recognized herein, this reduces the amount of communication bandwidth that is available to carry the multimedia data, which tends to be bandwidth-intensive. Moreover, the present invention recognizes that sending, e.g., decryption keys along with the multimedia data to be decrypted by the keys poses security problems, even if mere possession of the keys, without more, is insufficient to easily decrypt the content. An unauthorized eavesdropper who intercepts the encrypted content also receives at least some information useful in decrypting it, and consequently is that much closer to pirating the content.

SUMMARY OF THE INVENTION

A communication system includes a broadcast center wirelessly broadcasting multimedia streams to wireless receivers over a wireless broadcast link. The receivers are provided with control data associated with the multimedia stream over a bidirectional wireless link.

In a preferred embodiment, the bidirectional wireless link may be a CDMA link, an 802.11 link, or a Bluetooth link. The bidirectional wireless link may also be a point-to-point wireless communication link.

In exemplary embodiments, the control data can include encryption keys useful in decrypting the multimedia stream. The control data can also include data associated with a subscription to a multimedia broadcast service, data associated with a registration on a multimedia broadcast network, and applications useful in playing the multimedia data. Moreover, the control data can include billing information, data related to user preferences, and data related to levels of service related to providing the multimedia stream.

In a particularly preferred embodiment, a multimedia server containing a digital rights management (DRM) server is provided and is useful for encrypting the multimedia streams. Also, a digital broadcast multimedia (DBM) controller is provided and is useful for obtaining encryption keys from the DRM server and transmitting the keys to authorized users. Also, the DBM controller can use a network control center (NCC) transmitting keys to the authorized users' receivers. The network control center communicates with the wireless receivers over the bidirectional wireless link. An application server may be associated with the DBM controller for providing applications to receivers that are related to playing multimedia streams. An application server may also be associated with the network control center for providing to receivers additional applications related to playing multimedia streams. Some or all of the above-mentioned servers may be separate from each other or integrated together.

In another aspect, a method for providing a multimedia stream to a wireless communication device includes broadcasting the multimedia stream over a wireless broadcast channel, and transmitting, over a bidirectional wireless link, control data necessary for displaying the multimedia stream on the device.

In still another aspect, a wireless client station capable of communicating using at least two communication links includes a processor receiving a digital multimedia stream on a broadcast channel and control data on a bidirectional wireless link. The processor uses the control data to enable presentation of the multimedia stream on a display.

In yet another aspect, a system for providing a multimedia stream to a wireless communication device includes means for broadcasting the multimedia stream over a wireless broadcast channel. Also, the system includes means for transmitting, over a bidirectional wireless link, control data necessary for displaying the multimedia stream on the device.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a flow chart of the present process for providing broadcast multimedia streams on a broadcast unidirectional channel and control data and encryption keys on a bidirectional point to point link;

DETAILED DESCRIPTION OF THE PREFERRED EMBODIMENT

Figure 3:
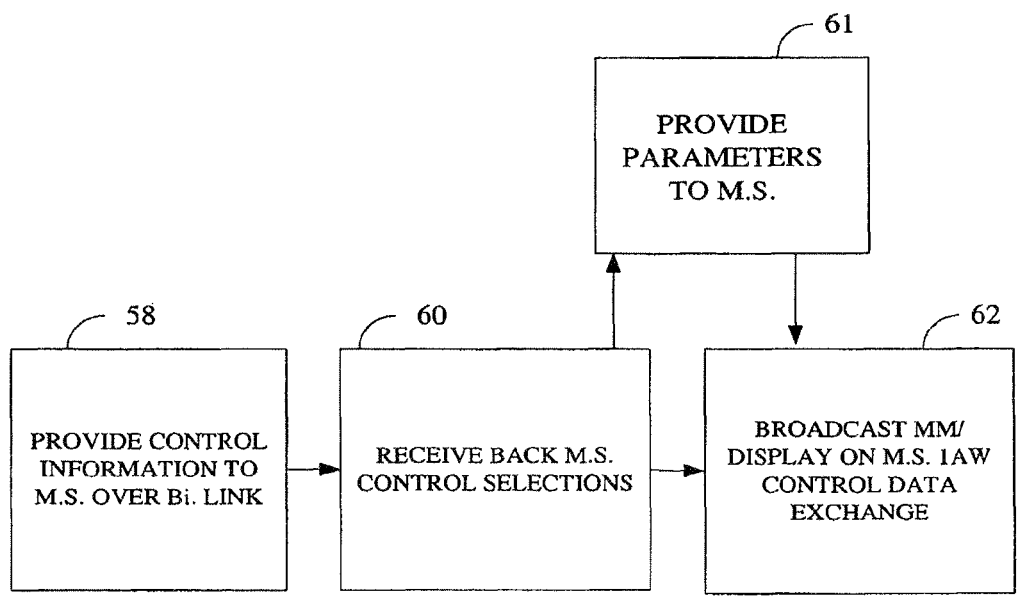
FIG. 3 is a flow chart showing the logic of control information transfer.

Referring initially to FIG. 1, a system is shown, generally designated 10, that includes a broadcast network operations center (NOC) 12 which wirelessly broadcasts, using a preferably unidirectional channel 14, digital multimedia content in the form of multimedia streams to wireless mobile stations 16 (only a single mobile station 16 shown for clarity). Also, program timing and code information can be received by the mobile station 16 over paging and/or synchronization channels of the broadcast channel 14 to track program slots (for DO-based architectures) or Walsh channels (for CDMA-based architectures).

The multimedia streams can be from one or more sources 18 that communicate with or are otherwise associated with the NOC 12. The streams can be sent to a computer-implemented multimedia server 20, which, if desired, can include a separate or integral digital rights management (DRM) server to encrypt the streams in accordance with digital rights management principles known in the art using encryption keys generated by the server 20 or provided over a bidirectional link by a digital broadcast media (DBM) controller 22 or other source. The multimedia server 20 can thus include an integrated or separate digital rights management center that provides encryption keys as appropriate to enforce digital rights policies.

The preferred DBM controller 22 can include a broadcast application server 22a, such as a BREW server, that provides, through the bidirectional link discussed further below, software and updates to the mobile station 16. Also, the preferred non-limiting DBM controller 22 can include a broadcast customer manager 22b that exchanges data with the mobile station 16 through the bidirectional link discussed below relating to control, subscription services, and billing. If desired, the broadcast application server 22a and broadcast customer manager 22b can be physically separate from the DBM controller 22 but nonetheless can communicate with the DBM controller The multimedia streams are transmitted by a unidirectional broadcast wireless transceiver system 24 of the NOC 12. The transceiver system 24 can use, without limitation, CDMA principles, GSM principles, or other wireless principles including wideband CDMA (WCDMA), cdma2000 (such as cdma2000 1× or 3× air interface standards, for example), TDMA, or TD-SCDMA, and OFDM.

As shown, the mobile station 16 includes a processor 26 that drives an audio, video, or audio/video (A/V) display 28, for presenting the multimedia streams on the display 28. Also, the mobile station 16 includes at least one and in some cases two (or more) communication receiver systems 30, 32. The first system 30 is configured for communicating with the NOC 12. In contrast, the second system 32 is configured for communicating over a bidirectional point-to-point link. When more than one receiver is used, both receivers may be implemented on the same computer chip if desired.

FIG. 1 also shows that in one non-limiting embodiment a network control center (NCC) 34 communicates with the mobile station 16 over a bidirectional point-to-point link 36. Also, the NCC 34 communicates with the NOC 12 in accordance with principles to be shortly disclosed, to effectively establish a second path for data communication between the NOC 12 and the mobile station 16 in addition to the unidirectional broadcast link 14. In alternate embodiments, the second path of communication between the mobile station 16 and DBM controller 22 can be through a bidirectional wireless point-to-point link that does not necessarily pass through a NCC, but which can be, e.g., a Bluetooth link or a 802.11 link directly to the DBM controller 22.

The NCC 34 can be the NCC of a commercial wireless telephone company. When the communication principles of the link 36 preclude use of the same communication receiver in the mobile station as is used for communicating with the NOC 12, the second receiver 32 of the mobile station 16 is used to communicate with the NCC 34. The bidirectional link 36 can be, e.g., a CDMA-based or GSM-based link.

When an NCC 34 is used, the NCC 34 may include a bidirectional wireless transceiver system 38 for two-way communication of data to and from the mobile station 16 in accordance with the disclosure below. An NCC controller/router 40 can also be included in the NCC 34, for receiving, e.g., encryption keys and other information, including software and software updates, from the DBM controller 22 and sending the information to the mobile station 16 for, e.g., decryption of encrypted multimedia streams received on the broadcast channel 14. Other control data, discussed below, from the DBM controlled 22 can be exchanged between the DBM controller 22 and NCC controller 40. The NCC controller 40 and DBM controller 22 preferably communicate using a secure connection, such as a virtual private network (VPN) over an Internet connection, although other links can be used.

Accordingly, it may now be appreciated that "control data" may encompass encryption keys as well as other types of information typically necessary to support commercial provision of multimedia on the broadcast channel 14. This can include data associated with a subscription to a multimedia broadcast service, as well as data associated with a registration on a multimedia broadcast network. Also, the control data may include software applications, such as BREW applications or BREW-supplied applications that are useful in playing the multimedia data or in viewing available titles. Moreover, control data that can be exchanged between the mobile station 16 and the DBM controller 22 via, e.g., the NCC 34 can include service or product ordering information and data related to user preferences, as well as data related to levels of service related to providing the multimedia stream. Also, data that is necessary for billing can be exchanged between the DBM controller 22 and the NCC controller 40. Further, a user of the mobile station can order products and services over the bidirectional link. The control data may also include data useful for de-interleaving, decompressing, and decoding the multimedia stream, as well as data that is useful for indexing into the multimedia stream for channel selection and tracking.

For instance, a user of the mobile station 16 can register on the broadcast network using the bidirectional link 36. The user can also subscribe to various multimedia broadcast services that might be provided on the broadcast channel 14, and can indicate a preference for a level of service (e.g., base layer only, base layer plus enhancement layer, etc.) and be billed accordingly. Moreover, the user can receive a list of available program titles over the link 36 and select a title of a multimedia stream for reception on the broadcast channel 14.

The process of the present invention can be appreciated in reference to FIG. 2, which can be undertaken using a computer. Commencing at block 42, encryption keys are produced in accordance with key principles known in the art by, e.g., the DRM center that is associated with the multimedia server 20, or by the DBM controller 22. A standard rights expression language such as XrML, ODRL, etc. can be employed to express license rights of individual users. Encryption methods such as the Advanced Encryption Standard (AES) or others can be used for the generation of keys and the encryption of multimedia streams. At block 44, the keys are provided to the multimedia server 20 of the NOC 12 and at block 46 the keys are used to encrypt multimedia streams to be broadcast at block 48.

FIG. 2 illustrates that in parallel with the above logic, once the keys are produced at block 42 they can be provided, using the DBM controller 22, to the mobile station over the bidirectional link 36 through the NCC 34. The mobile station 16 determines the need for one or more program keys for decoding one or more multimedia streams and requests a data connection over the bidirectional link 36 through the NCC 34 at block 49. The mobile station 16 requests the keys from the DRM server at block 52. At block 53, the M.S. request (its right to receive the keys) is authenticated by the DRM server. Assuming the mobile station is authorized to receive the keys, the keys are sent from the DBM controller 22 to the NCC controller/router 40 at block 50. From there, the keys are sent to the mobile station 16 at block 54 using the bidirectional link 36, either directly from the DBM controller 22 (when the link 36 is a Bluetooth or 802.001 link, for example, which directly links the controller 22 to the mobile station 16) or through the NCC 34. At block 56 the mobile station decrypts the content received on the broadcast channel 14 using the keys received on the bidirectional point to point link 36.

Now referring to FIG. 3, at block 58 certain control information mentioned above can be provided for selection by the mobile station 16 over the bidirectional link 36. For example, control information relating to allowing a user of the mobile station 16 to register or to select particular programs, or subscriptions, or broadcast fidelity options, and so on as mentioned above can be provided so that the user can appropriately select desired service options and transmit the selections back to the DBM controller 22 (through, e.g., the NCC 34) at block 60. In response, information is stored by the broadcast customer manager 22b and any parameters to decode the multimedia stream are transmitted back to the M.S. 16 over the bidirectional link 36 at block 61. At block 62 the multimedia streams associated with the control information exchange are sent to and decoded by the mobile station 16.

Figure 4:
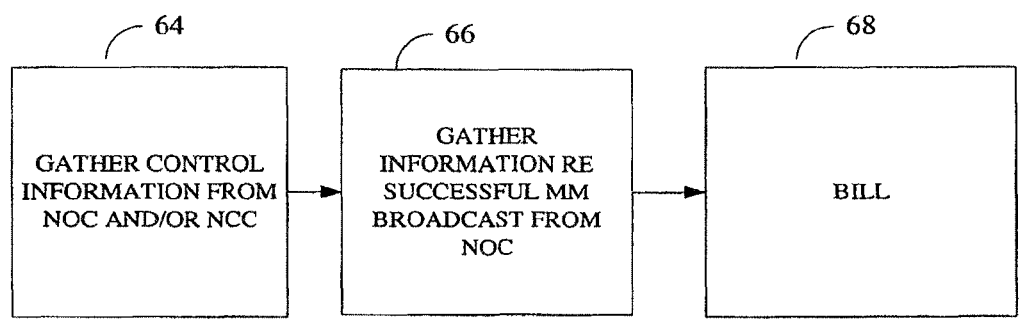
FIG. 4 is a flow chart of the billing logic.

Likewise, FIG. 4 shows that billing information may be exchanged over the bidirectional link 36. Commencing at block 64, control information relating to, e.g., particular programs or subscriptions or broadcast fidelity options that may have been selected by the user of the mobile station 16 is gathered from the DBM controller 22 at the NOC 12. In some implementations the control information may be retained temporarily by the NCC 34, in which case the control information is gathered from temporary storage. Also, at block 66 information relating to the services actually successfully provided to the mobile station 16 are gathered. The customer user of the mobile station 16 is billed at block 68 using the information gathered at blocks 64 and 66.

While the particular SYSTEM AND METHOD FOR CONTROLLING BROADCAST MULTIMEDIA USING PLURAL WIRELESS NETWORK CONNECTIONS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. A wireless client station capable of communicating using at least two communication links, comprising:
   at least one processor configured to receive a digital multimedia stream on a broadcast channel and control data on a bidirectional wireless link, wherein the control data supports provisioning of the digital multimedia stream for authorized access on the broadcast channel;
   wherein the control data enables presentation of the digital multimedia stream on a display and the control data received on the bidirectional wireless link includes at least one key for decrypting the digital multimedia stream, data for decompressing the digital multimedia stream, and at least one application for the presentation of the digital multimedia stream at the wireless client station.

2. The client station of claim 1, wherein the bidirectional wireless link is not associated with the broadcast channel.

3. The wireless client station of claim 1, wherein the broadcast channel is unidirectional.

4. The wireless client station of claim 1, wherein the bidirectional wireless link is one or more of: a CDMA link, a 802.11 link, a GSM link, a satellite link, or a Bluetooth link.

5. The wireless client station of claim 1, wherein the bidirectional wireless link is a point-to-point wireless communication link.

6. The wireless client station of claim 1, wherein the control data includes data associated with a subscription to one or both of a multimedia broadcast service or data associated with a registration on a multimedia broadcast network.

7. The wireless client station of claim 1, wherein the control data includes one or both of billing information data related to user preferences or data related to levels of service related to the digital multimedia stream.

8. The wireless client station of claim 1, wherein the digital multimedia stream is encrypted.

9. The wireless client station of claim 1, wherein the control data facilitates de-interleaving and decoding the digital multimedia stream.

10. The wireless client station of claim 1, wherein the control data includes data for indexing into the digital multimedia stream for channel selection and tracking.

11. The wireless client station of claim 1, wherein one or both of services or products are requested by the wireless terminal over the bidirectional wireless link.

12. A method of receiving a multimedia stream at a wireless client station capable of communicating using at least two communication links, comprising:
receiving the multimedia stream on a broadcast channel and control data that supports provisioning of the multimedia stream for authorized access on a bidirectional wireless link at the wireless client station;
wherein the control data received over the bidirectional wireless link includes at least one key for decrypting the multimedia stream, data for decompressing the multimedia stream, and at least one application for presentation of the multimedia stream at the wireless client station.

13. The method of claim 12, wherein the bidirectional wireless link is not associated with the broadcast channel.

14. The method of claim 12, wherein the broadcast channel is unidirectional.

15. The method of claim 12, wherein the bidirectional wireless link is one or more of: a CDMA link, a 802.11 link, a GSM link, a satellite link, or a Bluetooth link.

16. The method of claim 12, wherein the bidirectional wireless link is a point-to-point wireless communication link.

17. The method of claim 12, wherein the control data includes one or both of data associated with a subscription to a multimedia broadcast service data associated with a registration on a multimedia broadcast network.

18. The method of claim 12, wherein the control data includes one or both of billing information data related to user preferences or data related to levels of service related to the multimedia stream.

19. The method of claim 12, wherein the multimedia stream is digital and is encrypted.

20. The method of claim 12, wherein the control data facilitates de-interleaving and decoding the multimedia stream.

21. The method of claim 12, wherein the control data includes data for indexing into the multimedia stream for channel selection and tracking.

22. The method of claim 12, wherein one or both of services or products are requested by the wireless terminal over the bidirectional wireless link.

23. An apparatus for receiving a multimedia stream comprising:
means for receiving the multimedia stream on a broadcast channel and control data that supports provisioning of the multimedia stream for authorized access on a bidirectional wireless link at a wireless client station;
wherein the control data received over the bidirectional wireless link includes at least one key for decrypting the multimedia stream, data for decompressing the multimedia stream, and at least one application for presentation of the multimedia stream at the apparatus.

24. The apparatus of claim 23, wherein the bidirectional wireless link is not associated with the broadcast channel.

25. The apparatus of claim 23, wherein the broadcast channel is unidirectional.

26. The apparatus of claim 23, wherein the bidirectional wireless link is one or more of: a CDMA link, a 802.11 link, a GSM link, a satellite link, or a Bluetooth link.

27. The apparatus of claim 23, wherein the bidirectional wireless link is a point-to-point wireless communication link.

28. The apparatus of claim 23, wherein the control data includes one or both of data associated with a subscription to a multimedia broadcast service or data associated with a registration on a multimedia broadcast network.

29. The apparatus of claim 23, wherein the control data includes one or both of billing information data related to user preferences or data related to levels of service related to the multimedia stream.

30. The apparatus of claim 23, wherein the multimedia stream is digital and is encrypted.

31. The apparatus of claim 23, wherein the control data facilitates de-interleaving and decoding the multimedia stream.

32. The apparatus of claim 23, wherein the control data includes data for indexing into the multimedia stream for channel selection and tracking.

33. The apparatus of claim 23, wherein one or both of services or products are requested by the apparatus over the bidirectional wireless link.

* * * * *